Figure 1:
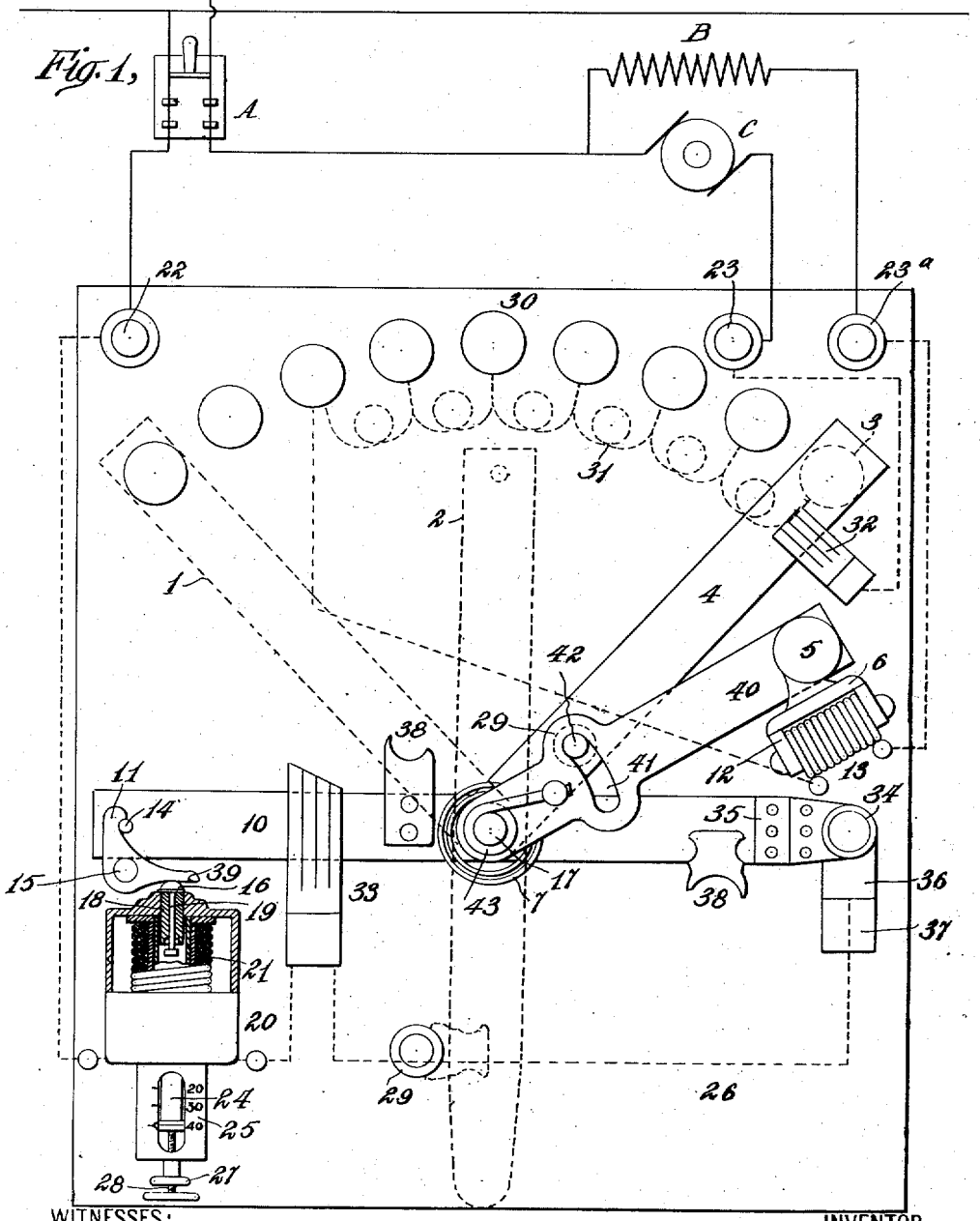

No. 12,473. REISSUED APR. 24, 1906.

H. W. LEONARD.

ELECTRIC CIRCUIT CONTROLLER.

APPLICATION FILED JULY 13, 1905.

2 SHEETS—SHEET 1.

WITNESSES:

Sidney Mann

John O. Gempler

INVENTOR

Harry Ward Leonard

BY

Kenyon & Kenyon

ATTORNEYS

No. 12,473. REISSUED APR. 24, 1906.

H. W. LEONARD.

ELECTRIC CIRCUIT CONTROLLER.

APPLICATION FILED JULY 13, 1905.

2 SHEETS—SHEET 2.

WITNESSES:

Sidney Fraum

John O. Gempler

INVENTOR

Harry Ward Leonard

BY

Kenyon & Kenyon

ATTORNEYS

UNITED STATES PATENT OFFICE.

HARRY WARD LEONARD, OF BRONXVILLE, NEW YORK.

ELECTRIC-CIRCUIT CONTROLLER.

No. 12,473. Specification of Reissued Letters Patent. Reissued April 24, 1906.

Original No. 681,716, dated September 3, 1901. Application for reissue filed July 13, 1905. Serial No. 269,556.

*To all whom it may concern:*

Be it known that I, HARRY WARD LEONARD, a citizen of the United States, residing in Bronxville, in the county of Westchester, State of New York, have invented a certain new and useful Improvement in Electric-Circuit Controllers, of which the following is a description.

My invention relates to the class of switches or rheostats provided with means for automatically opening or closing, regulating, or otherwise affecting or changing the condition of a circuit upon the occurrence of an abnormal increase in current or failure of supply to prevent injury to the translating devices in the circuit, said means being controlled in their automatic operation by electroresponsive devices.

The object of my invention is mainly to provide a circuit-controller of the character referred to with an electroresponsive device responding to abnormal increases in current, hereinafter referred to as "overload-currents," which will be safe and effective at all times—that is, both while the controller is being operated by hand to adjust it to the normal position and after adjustment—the overload switch or controller operated or controlled by said electroresponsive device being operative to respond to an overload-current even while the switch-operating lever of the controller is being moved by the operator.

A further object is to provide an overload electroresponsive device which may be adjusted to operate whenever the current reaches or exceeds a predetermined amperage and which will become more positive and reliable as the amount of overload increases.

A further object is to provide a more reliable locking device for the overload switch or controller and means for disengaging said locking device to release said switch or controller and also means for insuring the safe and proper operation of both the switch-levers when the electroresponsive devices act.

In carrying my invention into effect I employ in my preferred form two independently-movable switch-levers, one designed to open or close, regulate, or otherwise affect or alter the circuit upon the occurrence of an underload-current due to a failure of the supply electromotive force and the other for similarly or differently affecting the circuit, but independently of the former, upon the occurrence of an overload-current. The former is preferably held in its normal position by any suitable form of electroresponsive device, a magnet being preferred, the armature for which is carried by the switch-lever. This lever may, however, be held mechanically by a latch, for instance, and the latch released through the agency of a magnet or solenoid. The second switch-lever is preferably held in its normal position by a mechanical latch, the release being effected through the agency of a magnet or solenoid. The release or disengagement of the mechanical latch for the overload switch-lever and for the underload switch-lever when one is employed is preferably effected by a hammer-like blow produced by the action of the electroresponsive devices. In the preferred form of such devices I employ solenoids whose cores move vertically and which when actuated by the current flowing through the coils of the solenoid give a sharp blow upon the latch, which results in a quick release. The switch-levers are preferably always under spring tension, tending to move them when released. In controllers designed for handling large currents I employ knife-switches entering spring-clips or stationary contacts, and with such switches I preferably employ means for imparting a hammer-like blow to start them from the spring-clips when the electroresponsive devices respond to abnormal conditions in the circuit. The overload-switch is preferably provided with an auxiliary break of carbon or other material upon which the arc is broken. I also employ other features of construction, which will be more fully hereinafter referred to in connection with the accompanying drawings.

In the foregoing statement I have referred to a combined underload and overload switch or controller; but it will be understood that some features of my invention are not limited to their combined use—that is to say, in some features of my invention the devices responding to overload-currents may be separately employed in a switch or controller responding only to overload-currents, and the devices responding to underload-current may be likewise separately employed in a switch or controller responding only to underload-current. The electroresponsive devices may be connected in circuit in any suitable way. In some instances either or both of the electroresponsive devices might be in a different circuit from that in which the translating device to be protected is connected. When the apparatus is employed in the circuit of a motor, I connect the underload responsive device in most instances in series with the shunt field-winding of the motor and the overload responsive device in series with the motor-armature.

Figure 2:
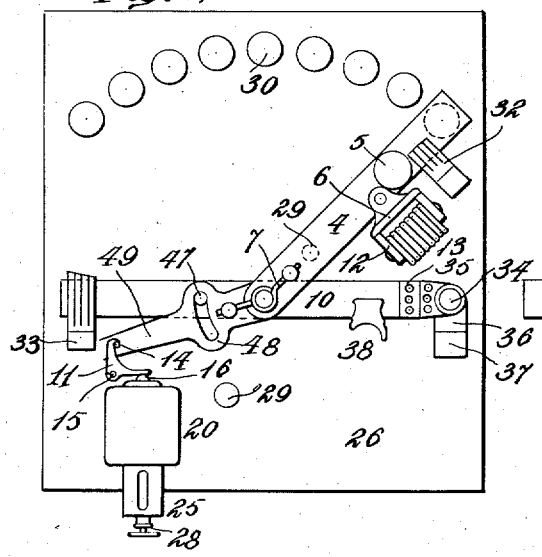
Figure 3:
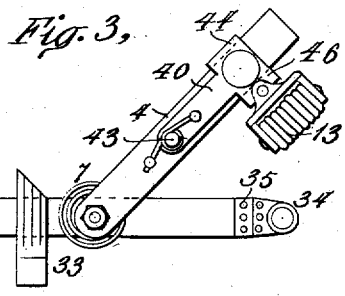
Figure 4:
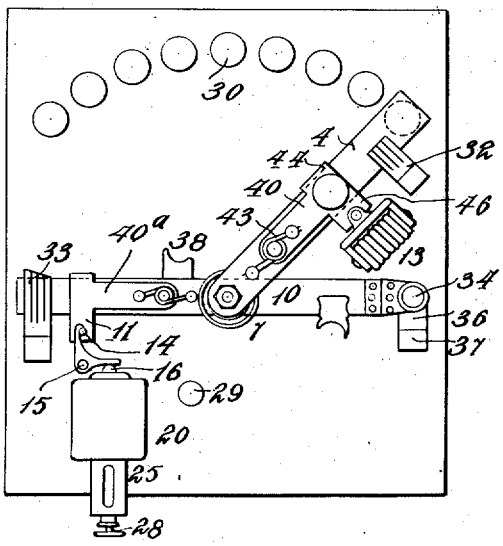
Figure 5:
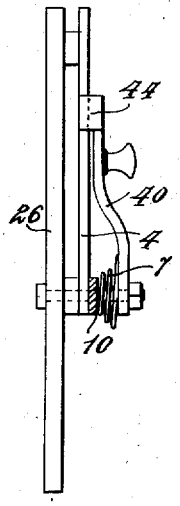

In accompanying drawings, which illustrate my invention, Figure 1 is a plan and diagrammatic view of a rheostat embodying certain features of my invention, a hammer-blow arm for the underload or rheostat switch being shown. Fig. 2 illustrates a construction like that of Fig. 1, but showing the hammer-blow arm applied to the overload-switch. Fig. 3 illustrates a modified form of hammer-blow arm for the underload or rheostat switch. Fig. 4 illustrates a construction having the hammer-blow arm of Fig. 3 applied to both switches, and Fig. 5 illustrates another modified form of hammer-blow arm applicable to both switches.

Referring to Fig. 1 of the drawings, 4 and 10 represent, respectively, the independently-movable underload and overload switches, the former being also the rheostat contact-lever. These levers are pivoted on a common stud having a spring 7 coiled around it under tension and arranged so as to tend to move the levers 4 and 10 to the dotted-line positions 1 and 2, respectively, when released. To limit the movement of the switch-levers when released and to reduce the effect of the blow, I provide rubber or spring buffers 29, one mounted upon the base 26 and the other mounted upon the under side of the switch-lever 4, the lever 10 being provided with two plates 38, adapted to engage with said buffers. The overload switch-lever 10 is provided with a pin 14, which is engaged by a latch 11, pivoted upon the base-plate 26 at 15. This latch is provided with a finger 39, which projects over a head 16, of insulating material, carried by a shank 19, working through a non-magnetic sleeve 18, fitted within the iron casing 20 of the solenoid-coil 21. The inner end of shank 19 has a small head to prevent displacement and against which the core 24 strikes when drawn upward or inward by the action of the solenoid. The head on core 24 rests normally upon the upper end of screw 28, which works through the bottom of a frame 25, secured to the casing 20. Screw 28 is locked in its adjusted position by a jam-nut 27. The head on core 24 is beveled to form a pointer or index, and the frame 25 is provided with graduations, as shown, to indicate the amperes for which the overload release may be set. The core is shown as adjusted for forty amperes, and when the current passing through coil 21 exceeds that amount the core will be actuated, and the rapid movement of the core will give a hammer-like blow to rod 19 and trip the latch 11, whereupon spring 7 will move switch-lever 10 to the dotted-line position 2. Switch-lever 10 at the left-hand side of its pivot makes contact with spring-clips 33, and at the right-hand end the lever is provided with an auxiliary break for taking the arc away from the switch-contact 33 when the switch-lever is operated. The auxiliary break is preferably made of carbon when the controller is intended for circuits having small currents and high electromotive forces; but when the controller is intended for circuits having large currents and low electromotive forces, and hence low resistances to consider, the carbon has so much resistance that it does not take all the arc away from the switch-contacts, and therefore I prefer in such instances to employ copper or other material of lower resistance than carbon for the auxiliary break. In the form shown in Fig. 1 lever 10 is provided with a carbon block 34, carried by a spring-socket 35, and this carbon block is arranged to make contact with a stationary member formed of a copper block 36 and carbon block 37. Thus in breaking the circuit with this switch the current passes first through carbon and copper and then carbon and carbon. The underload switch-lever 4 in its final position enters stationary spring-contacts 32, and in order to obtain a rapid break at this contact I employ an operating-handle 40 for the switch-lever 4, which operates to impart a blow to the switch. This operating-handle is pivoted upon the stud 17 and is provided with a slot 41, into which projects a pin 42, carried by lever 4. The armature 6 is pivoted upon this operating-handle and is held by the underload-magnet 13. From Fig. 1 it will be seen that when the operating-arm is moved to the right by means of its handle 5 the engagement with pin 42 will carry the switch-lever 4 in the same direction. It will also be seen that when the arm 40 is released by the magnet 13 it will be moved to the left by means of spring 43, which is also coiled around the stud 17, until the pin 42 reaches the other end of the slot 41, when a blow will be imparted to the pin sufficient to start the lever 4 from the spring-clip 32, whereupon the combined tension of springs 7 and 43 will drive the switch-lever 4 to the left to dotted-line position 1, the movement being arrested by its buffer striking the plate 38 on the left of the pivot. The contact-buttons and resistance are shown at 30 and 31, respectively. It will be understood, however, that the resistance will be carried upon the under side of the base-plate 26 and suitably protected and insulated, or the resistance may be mounted upon the under side of a base of slate or equivalent insulating material and covered by a metal box and insulated and arranged as shown in my Patent No. 657,703, issued September 11, 1900. The circuit connections for a motor speed controlling or starting rheostat will preferably be as shown in Fig. 1, where A indicates a double-pole line-switch, B the shunt field-winding of the motor, and C the armature of the motor. The field and armature are connected in two shunt-circuits, one including the motor-armature, overload-magnet, and both switches and the other including the motor field-winding, overload-magnet, both switches, resistance, and underload-magnet. The armature-shunt is from line-switch A to binding-post 22, through coils 21 of the overload release-solenoid to contact 33, switch-levers 10 and 4 to contact 32 to binding-post 23, and from binding-post 23 to motor-armature C to the other side of the line-switch A, the auxiliary break connection extending from contact 33 to copper block 36. The field-shunt extends from the final contact 3 of the resistance through the resistance 31 to underload-magnet 13, and from magnet 13 to binding-post 23[a], and from that binding-post through the motor field-winding B to the other side of the line-switch A. The normal operative position of the controller of Fig. 1 is shown in full lines. When an overload-current occurs, the release of switch-lever 10 is effected as above described, and spring 7 moves said lever to the dotted-line position 2, thus opening the circuit at stationary contact 33 and disconnecting both electroresponsive devices from the source of supply. As soon as magnet 13 becomes sufficiently deënergized through the gradual diminution of the counter-volts of the motor, which is then supplying the energizing-current for magnet 13 in the local closed circuit containing the motor-armature and field and magnet 13, operating-arm 40 is released, which delivers a blow to switch 4, as above described, starting it from its spring-contact 32. The tendency of levers 4 and 10 is to move toward each other under the influence of spring 7 when released; but it will be seen that when lever 10 is released and the circuit is opened by it, lever 10 will reach the dotted-line position 2, while the switch-lever 4 remains upon contact 32, being held by a current due to the counter-volts of the motor. Therefore lever 10 will reach the dotted-line position 2 and be there arrested by buffers 29 before switch 4 begins to move. To return lever 10 to its normal position, lever 4 is moved to the left by its operating-lever 40 to the dotted-line position 1, and switch 4 through buffer 29 and plate 38 will move switch 10 before it from position 2 to its normal closed position in engagement with spring-contact 33, when lever 10 will be locked in position by latch 11, the circuit being opened by 4. Switch-lever 4 is then returned to its normal position, the circuit being closed through both electroresponsive devices when switch 4 makes contact with the first resistance-contact, and when this lever reaches its final position armature 6 will strike the pole-pieces 12 of magnet 13, magnetism holding the armature, and hence the lever 40, in that position. When an underload occurs, magnet 13 releases the operating-lever 40, and its spring 43 drives it forward and imparts a blow to switch 4, as above described, the spring 7 and 43 driving the levers forward until lever 4 is arrested at position 1 by its buffer 29 striking the plate 38 on lever 10, which remains locked in its normal position. To close the circuit again, it is now only necessary to return lever 4 to its normal position, where, if the current is normal, it will be held again, as above explained. If while the operator is moving the switch 4 after the overload-switch 10 is closed the current through coil 21 should exceed the amount for which the controller is set, the overload-switch will be released and open the circuit instantaneously, or, in other words, the instant the current-energizing coil 21 is sufficient to actuate its armature 24. If for any reason the supply energy fails entirely or decreases abnormally while switch 4 is being operated, magnet 13 will not hold lever 40, and hence switch 4, in their final or normal positions against the tension of spring 7 and 43, and these levers will return to the starting position the instant the operator removes his hand from the operating-handle. Thus it will be seen that by employing two independently-movable switch-levers controlled substantially as described by two electroresponsive devices the circuit cannot be maintained an instant unless it is in its normal condition. It will also be seen that the functional connection or arrangement which necessitates the closure of the overload-switch through means dependent upon the movement of the underload-switch, so that the former can only be closed while the latter is open or in a protective position, prevents all injury to the translating devices in the circuit should an overload-current occur while the controller is being operated. Moreover, by placing the operating-handle upon or interlocking it with or similarly relating it to the underload switch-lever the overload switch-lever is always free to respond instantly to an overload-current. Such would not be the case if the overload-switch were closable by hand while the underload-switch is in its normal operating closed position, because in that case should an overload occur while the controller is being operated the damage which an overload-current would cause would actually be done before the operator could remove his hand from the operating-handle. Of course it will be understood that the switch-lever could be made to close separately and independently instead of closing the overload first by means of the underload-switch or operating-lever and still accomplish my results if some means were provided whereby, after overload had opened the overload-switch, the circuit could not be closed to its normal operating condition except while the overload-switch is in its protective condition, and such an arrangement would be within the scope of my invention. It will also be understood that the controller can be employed to close a circuit instead of opening a circuit, as described.

In Fig. 2 I have shown the hammer-blow device of Fig. 1 applied to the overload switch-lever, the stationary contact for this switch in this arrangement being arranged to engage the left-hand end of the switch. Switch-lever 10 is provided with a pin 47, which projects into a slot 48 in the arm 49 and which arm is pivoted upon the stud-carrying levers 10 and 4. Spring 7 is secured to arm 49 and lever 4 and performs the function of spring 7 of Fig. 1 in addition to causing the arm 49 to impart the hammer-blow to lever 10. The locking-latch 11 in this form engages a pin 14 on arm 49 and holds lever 10 in the normal position through the engagement of pin 47 with arm 49. When arm 49 is released by the action of the overload-solenoid, spring 7 will swing arm 49 and cause it to strike pin 47, the blow starting lever 10 from spring-clip 33, and then spring 7 forces both arm 49 and lever 10 toward lever 4. The movement is arrested by the projections 38 on the right-hand side of lever 10 striking buffer 29, as in the arrangement of Fig. 1. To close the overload-switch, switch-lever 4 is moved to the left, the buffer 29 on the under side of the latter engaging arm 49 and moving it toward the left until pin 47 reaches the end of slot 48, when switch-lever 10 will be carried along and forced into spring-clip 33 and pin 14 on arm 49 into engagement with latch 11.

In the modification shown in Fig. 3 the operating-lever 40 is pivoted directly upon switch-lever 4. The handle 5 for lever 40 is mounted upon the cross-piece on the arm 40, and which cross-piece is provided with fingers 44 and 46, projecting downwardly on opposite sides of the switch-lever 4. Armature 6 is pivoted upon the cross-piece, and a spring 43 is coiled around the pivot of the lever 40, one end being secured to the switch 4 and the other end to the lever 40. In this construction when armature 6 is released spring 43 swings arm 40 on its pivot, causing finger 46 to strike the switch 4, imparting a blow sufficient to start the switch from the stationary contact. The weight of armature 6 in this form increases the effect of the blow.

In Fig. 4 I have shown the hammer-blow device of Fig. 3 applied to both switch-levers, and in this arrangement the pin 14, with which the latch 11 engages, is carried by the cross-arm of the hammer-blow device $40^a$, and it will be seen that when the overload-solenoid responds to an overload-current latch 11 will be tripped and the projection on the cross-piece of arm $40^a$ will strike a blow to switch 10 and drive it from its stationary contact 33, which in this construction is preferably arranged at the left-hand end of the switch-lever.

In Fig. 5 I have shown a form of hammer-blow arm 40 like that of Fig. 3, but pivoted upon the switch-pivot instead of upon the switch-lever. In this arrangement the ends of spring 7 are secured, respectively, to switch 10 and arm 40, thus serving to operate the three levers, as will be evident.

The features of my improved controller have been described and illustrated only in connection with single-pole controllers; but it is obvious that such features may be applied to double-pole switches by simply providing the necessary number of contacts and properly insulating the several switch members or by altering the form of the switch-levers, and it is evident that such a modification is within the scope of my invention. It will also be evident that by the application of well-known methods and means my improved controller may be employed on circuits of alternating currents. While the various switches are shown with the arms moving in a plane parallel to the base-plate 26, it will be understood that in many cases it will be desirable to have the switch-levers so mounted as to move at right angles to the plane of the base-plate.

Wherever in the claims I employ the limiting phrases "in a circuit-controller" or "in a circuit-controlling rheostat" or "in a motor-controlling switch" or "in a motor-rheostat" I intend to describe and to be limited to a combination in which the elements are so functionally related as to be adapted to secure the new and useful results described in the specification or illustrated in the drawings.

I do not claim herein the broad feature of two switch-levers functionally connected and movable independently in responding to abnormal conditions in the circuit, as described herein, since that feature forms the subject-matter of my application filed March 27, 1899, Serial No. 710,726, of which the present application is a division.

What I claim is—

1. In a circuit-controller, the combination of two independently-movable switch-levers, an electroresponsive device for controlling one of said levers and responding to failure or abnormal decrease of current to release said lever, means for moving said lever when released to affect the circuit, an electroresponsive device for controlling the other lever and responding to abnormal increases of current to release said second lever, means for moving said lever when released to affect the circuit, and means for imparting blows to said switch-lever to start them when released.

2. In a circuit-controller, the combination of two independently-movable switch-levers, an electroresponsive device for controlling one of said levers and responding to failure or abnormal decrease of current to release said lever, means for moving said lever when released to affect the circuit, a mechanical latch for holding the other lever in its normal position, an electroresponsive device responding to abnormal increases of current to release said lever, means for moving said lever when so released to affect the circuit, and means for imparting blows to said switch-levers to start them when released.

3. In a circuit-controller, the combination of two independently-movable switch-levers, an electroresponsive device for controlling one of said levers and responding to failure or abnormal decrease of current to release said lever, means for moving said lever when released to affect the circuit, a mechanical latch for holding the other lever in its normal position, an electroresponsive device responding to abnormal increases of current to impart a blow to said latch to release said lever, means for moving said lever when so released to affect the circuit, and means for imparting blows to said switch-levers to start them when released.

4. In a circuit-controller, the combination with a movable switch member, and a stationary member with which said movable member is designed to make heavy rubbing contact, of means controlled by an electroresponsive device for imparting a blow to said movable switch member, said electroresponsive means responding to failure or abnormal decrease of current.

5. In a circuit-controlling rheostat, the combination with a series of contact-pieces with which the sections of the resistance are connected, and a movable arm adapted to make contact with said series of contact-pieces and heavy rubbing contact with a final contact-piece, of means controlled by an electroresponsive device for imparting a blow to said movable arm.

6. In a circuit-controller, the combination with stationary switch members, of two movable members independently movable, an electroresponsive device for controlling one of said movable members and responding to abnormal decreases in current to release said member, means for imparting a blow to said member to start it when released, and means for moving said member when so released to affect the circuit.

7. In a circuit-controller, the combination with stationary switch members, of two movable members independently movable, a latch for holding one of said members in its normal position, an electroresponsive device responding to abnormal increases in current to effect the release of said member, an electroresponsive device responding to abnormal decreases in current to release the second movable member, means for imparting a blow to said second movable member to start it when released, and means for moving said member when so released to affect the circuit.

8. In a circuit-controller, the combination with stationary switch members, of two movable members independently movable, a latch for holding one of said members in its normal position, an electroresponsive device responding to abnormal increases in current to impart a blow to said latch to release said member, an electroresponsive device responding to abnormal decreases in current to release the second movable member, means for imparting a blow to said second movable member to start it when released, and means for moving said member when so released to affect the circuit.

9. In a circuit-controller, the combination with stationary switch members, of two movable members independently movable, an electroresponsive device for controlling one of said movable members and responding to abnormal increases in current to effect the release of said member, an auxiliary break for said member, an electroresponsive device responding to abnormal decreases in current to release the second movable member, means for imparting a blow to said second movable member to start it when released, and means for moving said member when so released to affect the circuit.

10. In a circuit-controller, the combination with stationary switch members, of two movable members independently movable, an electroresponsive device for controlling one of said movable members and responding to abnormal increases in current to effect the release of said member, an auxiliary break for said member, means for adjusting said electroresponsive device for different currents, an electroresponsive device responding to abnormal decreases in current to release the second movable member, means for imparting a blow to said second movable member to start it when released, and means for moving said member when so released to affect the circuit.

11. In a circuit-controlling rheostat, the combination with a series of contact-pieces with which the sections of the resistance are connected, a movable arm adapted to make contact with said series of contact-pieces and heavy rubbing contact with the final contact-piece, means controlled by an electroresponsive device responding to abnormal decreases in current for imparting a blow to said arm, means for moving said arm to its initial or starting position after the blow is struck, and a switch controlled by an electroresponsive device responding to abnormal increases in current to affect the circuit.

12. In a circuit-controller, the combination with a pivoted knife-switch lever, of switch-contacts coöperating with one end of said lever, an auxiliary break coöperating with the other end of said lever, an electroresponsive device for controlling said lever and responding to abnormal variations in current to release said lever, and means for imparting a blow to said lever when released.

13. In a circuit-controller, the combination with a pivoted knife-switch lever, of switch-contacts coöperating with one end of said lever, an auxiliary break coöperating with the other end of said lever, means for holding said lever in its normal position, an electroresponsive device for releasing said lever, and means for imparting a blow to said lever when released.

14. In a circuit-controller, the combination with a centrally-pivoted circuit-controlling switch-arm, stationary switch-contacts upon opposite sides of the pivot of said arm, and with which said arm makes contact, means for imparting a blow to said switch-arm, and an electroresponsive device for controlling said means.

15. In a circuit-controller, the combination with stationary switch-contacts, a movable contact-arm, a slotted operating-arm for said movable contact-arm, the latter having a projection working in the slot of said operating-arm, a spring placed under tension by said operating-arm, and whereby said arm is caused to impart a blow to said contact-arm, and an electroresponsive device controlling the action of said operating-arm.

16. In a circuit-controller, the combination with a centrally-pivoted circuit-controlling switch-arm, stationary switch-contacts upon opposite sides of the pivot of said arm and with which said arm makes contact, a slotted operating-arm for said switch-arm, the latter having a projection working in the slot of said operating-arm, a spring placed under tension by said operating-arm, and whereby said arm is caused to impart a blow to said switch-arm, and an electroresponsive device controlling the action of said operating-arm.

17. In a motor-controller, the combination of an overload-switch, an independently-movable underload-switch, two electroresponsive devices for controlling the automatic operation of said switches and responding respectively to overloads and underloads, said overload device and both switches being arranged for connection in series in the armature-circuit of a motor, and said underload device being arranged for connection in series with both switches and said overload device in the field-circuit of the motor, and said devices responding independently of each other to abnormal conditions and whereby either switch is caused to affect the motor-circuit.

18. In a motor-rheostat, the combination of the resistance and its switch, an independently-movable switch, an electroresponsive device responding to underloads for controlling the automatic operation of said resistance-switch, an electroresponsive device responding to overloads for controlling the automatic operation of the other switch, said underload device being arranged for connection in the field-circuit of a motor, and said overload device being arranged for connection in the armature-circuit of the motor, and said devices responding independently of each other to abnormal conditions and whereby either switch is caused to affect the motor-circuit.

19. In a motor-rheostat, the combination of the resistance and its switch, an independently-movable switch, an electroresponsive device responding to underloads for controlling the automatic operation of said resistance-switch, an electroresponsive device responding to overloads for controlling the automatic operation of the other switch, said underload device being arranged for connection in series with the overload device, both switches and the resistance in the field-circuit of the motor, and said overload device being arranged for connection in series with both switches in the armature-circuit of the motor and said devices responding independently of each other to abnormal conditions and whereby either switch is caused to affect the motor-circuit.

20. A translating device, an automatic switch whose automatic movement is dependent upon a current other than the current passing through said translating device, a second automatic switch whose automatic movement is dependent upon the current through said translating device, said switches being functionally connected.

21. A device producing an electromotive force by magnetic induction, an automatic switch whose automatic movement is dependent upon a current other than the current passing through said device, a second automatic switch whose automatic movement is dependent upon the current through said device, said switches being functionally connected.

22. An electroresponsive device in series with a shunt field-winding of an electric motor, a resistance-controlling switch controlled thereby, an electrically-controlled switch electrically connected therewith, said two switches being functionally connected.

23. An electroresponsive device in series with a shunt field-winding of an electric motor, a resistance-controlling switch controlled thereby, an automatic overload-switch electrically connected therewith, said switches being functionally connected.

24. An electroresponsive device in series with a shunt field-winding of an electric motor, a switch controlled thereby, an automatic overload-switch electrically connected therewith, said switches being functionally connected.

25. Two automatic switches protectively related as to their relative movement under certain conditions, one being responsive to the current in one branch of a divided circuit, and the other being responsive to a current in another branch.

26. An electromotive-force-producing device, an overload magnetic circuit-breaker in series therewith, and an automatic switch, which switch remains unaffected as regards movement when the circuit is opened by said overload magnetic circuit-breaker.

27. The combination of a spring-actuated resistance-controlling switch, restraining means therefor controlled by magnetism due to a current other than the armature-current of a motor, and an automatic magnetic circuit-breaker, the coil and switch of which carry the motor armature-current, the two switches being functionally connected.

28. The combination of a spring-actuated device, restraining means therefor controlled by magnetism due to a current other than the armature-current of a motor, a resistance-controlling arm moved thereby and having a limited independent movement relative thereto and an overload protective switch functionally related to the first-named device.

29. In a motor-controlling switch, the combination with a switch comprising two functionally-connected movable switch elements, of an electroresponsive device responding to overloads and arranged for connection in the armature-circuit of a motor, a second electroresponsive device responding to underloads and arranged for connection in the field-circuit of the motor, said electroresponsive devices responding independently of each other to abnormal conditions to control the motor-circuit.

30. An electromotive-force-producing device, two pivotally-connected automatically-movable switches in series therewith, one switch being automatically movable in response to abnormal current through the device, and the other switch being automatically movable in response to abnormal current in a circuit other than that through the device.

31. An electromotive-force-producing device, two pivotally and functionally connected automatically-movable switches in series therewith, one switch being automatically movable in response to abnormal current through the device, and the other switch being automatically movable in response to abnormal current in a circuit other than that through the device.

32. The combination of a resistance, a resistance-controlling switch, an independently-movable switch, an electroresponsive device for controlling the automatic operation of said resistance-controlling switch, an electroresponsive device for controlling the automatic operation of the other switch, said first electroresponsive device being arranged for connection in the field-circuit of a motor, and the said other electroresponsive device being arranged for connection in the armature-circuit of the motor, and said switches being functionally connected and responding independently of each other to abnormal conditions.

33. In a motor-controller, two independently-movable functionally-connected switches controlled by separate electroresponsive devices, one switch being controlled by an electroresponsive device in series with the motor-armature, and the other switch being controlled by an electroresponsive device not in series with the motor-armature.

34. An electric motor having a field-winding energized by a current other than its armature-current, two functionally-connected switches in series with each other and with the motor-armature, one switch being controlled under certain conditions by an electroresponsive device in series with the motor-armature, and the other switch being controlled under certain conditions by an electroresponsive device responsive to a current other than the armature-current.

35. A translating device, an adjustable resistance in series therewith, an overload protective device in series with the translating device, a protective device energized by a current other than that passing through the translating device, and means for preventing the closing of the circuit through the translating device except after a protective amount of resistance has been inserted in the circuit.

36. A translating device, two switches in series therewith, means for opening the circuit at either switch, means for preventing the closing of one switch except when the other switch is in a protective position, and two independent electroresponsive devices for automatically protecting the translating device upon occurrence of failure of supply-electromotive force and upon excessive current in the circuit respectively, one of said electroresponsive devices in series with the said translating device and the other not in series therewith.

37. A translating device, an automatic overload-switch in series therewith automatically responsive to predetermined overload-current through the translating device, and a resistance-controlling switch responsive to a current other than the current through the translating device, said switches being functionally connected.

38. Two switches in series with each other and with the armature of an electric motor, one switch being a resistance-controlling switch which must be moved to a certain position before the other switch can be closed, and two independent electroresponsive devices for protecting the motor-armature under abnormal conditions, one of said electroresponsive devices being in series with the motor-armature, and the other being not in series with it.

39. Two automatically-movable functionally-connected switches, two independent electroresponsive devices controlling the automatic movement of said switches respectively, one of said electroresponsive devices being responsive to a certain current, and the other being responsive to a different current.

40. An electromotive-force-producing device, two automatic switches, and means for preventing the closing of said switches except in definite sequence, one of the said automatic switches being responsive to a current other than that through the device.

41. Two electrically-controlled automatically-movable electric switches, means for preventing their closing except in definite sequence, an electromotive-force-producing device, one of said switches being automatically responsive to abnormal current through the electromotive-force-producing device.

42. Two automatically-movable electric switches, means for preventing their closing except in definite sequence, an electromotive-force-producing device, one of said switches being automatically responsive to abnormal current through the electromotive-force-producing device and the other switch being automatically responsive to abnormal electromotive force upon said electromotive-force-producing device.

43. An electric circuit, two functionally-related switches connected therewith, and means whereby said switches are independently and automatically movable each in response to a different condition of the said circuit respectively.

44. An electromotive-force-producing device, two switches in series therewith which can be closed only in definite sequence, and two independent electroresponsive devices, one of which is in series with the electromotive-force-producing device, and the other of which is not in series with it.

45. Two switches having a common electrical contact-surface between them, one switch being a resistance-controlling switch, the other switch being an automatic overload circuit-breaker normally restrained in its closed position by mechanical restraining means, which upon predetermined overload-current is released by a hammer-blow due to a mass moving under the influence of magnetism and an electroresponsive protective device responsive to a current different from that through the winding of the circuit-breaker.

46. Two independently-movable automatic switches in series with the counter-electromotive-force element of an electric motor and with each other, said two switches being responsive to currents in different circuits respectively and being so related that a definite sequence of closing the two switches is necessary, mechanical restraining means for one of said switches, means for delivering a hammer-blow due to the relative action of magnetism and gravity for the purpose of releasing said mechanical restraining means, and means for automatically moving said switch when so released.

47. Two different electric circuits, a translating device, two switches functionally related to each other and each being in series with the translating device, means for moving said switches automatically and independently of each other in response to certain conditions of said circuits respectively.

48. A translating device, two functionally-related automatic switches, each switch being in series with the translating device, one switch being responsive to a condition of current through the translating device, and the other switch being responsive to a condition of the voltage supplied to the translating device.

49. A switch automatically responsive to abnormal voltage conditions, a second switch automatically responsive to abnormal current conditions, and means whereby one switch is related to the other as regards its closing movement.

50. A motor having a shunt-field winding, two switches in series with the armature of the motor and closable only in definite sequence, and two electroresponsive protective windings one in series with the motor-field winding and the other in series with the motor-armature each of said windings producing a magnetic field independent of that produced by the other winding.

51. Two switches in series with each other and with a motor-armature, a single means controlling the closing movement of said switches, and two electroresponsive devices for automatically protecting the motor-armature circuit against overload-current and no voltage respectively, the no-voltage electroresponsive device being not in series with the armature relative to the source of supply, but being always in a local closed circuit with the motor-armature.

52. A motor-armature, a switch in series therewith, a resistance-controlling switch, also in series therewith whose movement effects the closing of the first-named switch, and two independent electromagnetic windings, which act automatically and independently to protect the circuit under two different abnormal conditions respectively, one of said windings being not in series with the armature.

53. A hand-operated armature-controlling switch, a second switch whose closure is effected by the movement of the hand-operated switch, and independent electroresponsive means for protecting the armature-circuit upon occurrence of excessive current or supply electromotive-force failure, one of said electroresponsive means being not in series with the armature.

54. A motor-armature, two switches electrically connected therewith having a common electrical contact-surface between them, closable only in definite sequence, a controlling electroresponsive winding for each switch, one of said windings being not in series with the armature.

55. A motor-armature, a no-voltage automatic switch, and an overload automatic switch, protectively related to said armature, the no-voltage switch being moved automatically only upon no voltage, and the overload-switch being moved automatically only upon overload-current.

56. The combination in motor-controlling mechanism of protective electroresponsive means in series with the shunt field-winding, protective electroresponsive means in series with the armature, two switches in series with each other and with the armature, the closure of one switch being caused by the movement of the other switch.

57. An electric motor having a field-winding energized by a current independent of its armature-current, two switches in series with each other and with the motor-armature, a single means controlling the closing movement of said switches, and two electromagnetic automatically-protective windings one in series with said field-winding and one in series with the motor-armature.

58. Two different circuits, a motor-armature functionally related thereto, two switches in series with the armature and with each other, said switches being protectively related to each other as to their relative movement under certain conditions, and means whereby said switches are electroresponsively automatically movable in response to abnormal conditions in said different circuits respectively.

59. A motor-armature, two switches in series therewith and with each other, said switches being mechanically protectively related to each other as to their movement under certain conditions, and two protective electromagnets one having its winding in sereis with the motor-armature and the other having its winding not in series with the motor-armature relative to the source of supply, but being always in a local closed circuit with the motor-armature.

60. A motor-armature, three switches in series with each other and with the motor-armature, one being a manually-operated switch, and each of the other two switches being an automatic electrically-controlled switch, and two electroresponsive devices for protecting the motor-armature circuit against abnormal conditions, one of said devices being not in series with the motor-armature.

61. In a motor-controlling switch, the combination with the switch elements, of an electroresponsive device responding to overloads and arranged for connection in the armature-circuit of a motor, a second electroresponsive device responding to underloads and arranged for connection in the field-circuit of the motor, said electroresponsive devices responding independently of each other to abnormal conditions to control the motor-circuit.

62. In a motor-controlling switch, the combination with the switch elements, of an electroresponsive device responding to overloads and arranged for connection in the armature-circuit of a motor, a second electroresponsive device responding to underloads and arranged for connection in the field-circuit of the motor, said electroresponsive devices responding independently of each other to abnormal conditions to control the armature-circuit of the motor.

63. In a motor-rheostat, the combination with the resistance and switch elements, of an electroresponsive device responding to overloads and arranged for connection in the armature-circuit of a motor, a second electroresponsive device responding to underloads and arranged for connection in the field-circuit of the motor, said electroresponsive devices responding independently of each other to abnormal conditions to control the motor-circuit.

64. In a motor-rheostat, the combination with the resistance and switch elements, of an electroresponsive device responding to overloads and arranged for connection in the armature-circuit of a motor, a second electroresponsive device responding to underloads and arranged for connection in the field-circuit of the motor, said electroresponsive devices responding independently of each other to abnormal conditions to control the armature-circuit of the motor.

65. In a motor-controller, the combination of an overload-switch, an independently-movable underload-switch, two electroresponsive devices for controlling the automatic operation of said switches and responding respectively to overloads and underloads, said overload device being arranged for connection in the armature-circuit of a motor and said underload device being arranged for connection in the field-circuit of the motor, and said devices responding independently of each other to abnormal conditions and whereby either switch is caused to affect the motor-circuit.

66. A field-winding of an electric motor, two independently-movable current-carrying elements each in series therewith under certain conditions, said movable elements being mechanically protectively related to each other as to their movement under certain conditions, and two protective electromagnetic windings, one in series with the said field-winding, and the other in series with the motor-armature, each of said windings producing a magnetic field independent of that produced by the other winding.

67. The combination in motor-controlling mechanism of electroresponsive means in series with the shunt field-winding, electroresponsive means in series with the armature two switches each at times in series with the shunt-field winding, the movement of one of said switches being caused under certain conditions by the movement of the other switch.

68. An electric motor having a field-winding energized by a current independent of its armature-current, two switches each in series with said field-winding under certain conditions, and two electromagnetic windings, one in series with said field-winding and one in series with the motor-armature, each of said windings producing a magnetic field independent of that produced by the other winding.

69. An electric motor having a field-winding energized by a current independent of its armature-current, two switches each in series with the said field-winding under certain conditions, and two electromagnetic windings, one in series with the motor-armature and one not in series with the motor-armature, each of said windings producing a magnetic field independent of that produced by the other winding.

70. In a motor-controlling switch, the combination of two mechanically functionally related, independently-movable, current-carrying elements, of an electroresponsive winding in series with the armature of the motor, a second electroresponsive winding in series with a field-winding of the motor, said windings responding to abnormal conditions to control the armature and field circuit of the motor.

71. A translating device, an adjustable resistance in series therewith, protective means comprising an electromagnetic winding in series with said device, a pivotally-connected switch movable to its operative position through the agency of the movable element of the adjustable resistance, said resistance-controlling movable element being automatically moved in response to abnormal electrical conditions affecting the translating device.

72. An electric motor having a field-winding energized by a current other than its armature-current, an armature-protective device automatically movable to protect the motor-armature, electroresponsive means comprising two electromagnetic windings, one of which is in series with the armature and the other of which is in series with the said field-winding, said electroresponsive means controlling the automatic movement of the armature-protective device, and a pivotally-connected movable element by which the armature-protective device is moved to its normal operative position.

73. An electric motor having a field-winding energized by a current other than its armature-current, an electromagnetic winding in series with the armature, an electromagnetic winding in series with the said field-winding, current-controlling means automatically movable and controlled by said windings, said current-controlling means comprising a resistance-controlling movable element and a pivotally-connected switch device, the movement of the switch device being controlled under certain conditions by the resistance-controlling element.

74. An electric motor having a field-winding in parallel with its armature relative to the source of supply, two functionally-related independently-movable switches for controlling the motor, a resistance in series with the field-winding relative to the source when the full working electromotive force is upon the motor-armature, and means insuring that said resistance shall not be in series with the field-winding when the starting-current is applied to the motor-armature, and two protective electromagnetic windings for automatically controlling the motor-circuit, each of said windings producing a magnetic field independent of that produced by the other winding.

75. A circuit containing a motor-armature and an electroresponsive winding, which circuit is maintained permanently closed, a movable switch element controlled by said winding and automatically movable in response to abnormally low voltage on said motor-armature, and a second independently-movable switch element automatically movable in response to a different abnormal condition affecting the motor-armature, each of said switch elements being in series with the motor-armature relative to the source of supply.

76. A circuit containing a motor-armature and an electroresponsive winding responsive to abnormally low voltage upon the motor-armature, said circuit being maintained permanently closed, a circuit containing the source of supply, said motor-armature and an electroresponsive winding responsive to overload-current through said motor-armature, and two functionally-related, independently-movable switch elements controlling said motor-armature, each switch element being in series with the motor-armature relative to the source of supply, each of said windings producing a magnetic field independent of that produced by the other winding.

77. A circuit containing a motor-armature and also an electroresponsive device responsive to a condition of abnormally low voltage in said circuit, a switch for controlling said motor-armature and controlled by said electroresponsive device, and a second switch protectively functionally related to said first switch, said second switch being normally restrained against a force tending to move it.

78. A circuit containing a motor-armature and also an electroresponsive device responsive to abnormally low voltage, a switch for controlling said motor-armature and controlled by said electroresponsive device, a second switch protectively functionally related to said first switch and in series with it and with the armature relative to the main supply-lines, and means independent of the opening of said circuit containing the armature and electroresponsive device for protecting the motor-armature upon occurrence of overload.

In testimony whereof I have signed my name to this specification in the presence of two subscribing witnesses.

H. WARD LEONARD.

Witnesses:
J. A. STEVENSON,
CAROLYN G. LEONARD.